(12) United States Patent
Yamada et al.

(10) Patent No.: US 11,165,119 B2
(45) Date of Patent: Nov. 2, 2021

(54) BATTERY UNIT MOUNTING STRUCTURE OF ELECTRIC VEHICLE

(71) Applicant: MAZDA MOTOR CORPORATION, Hiroshima (JP)

(72) Inventors: Morihide Yamada, Hiroshima (JP); Kazuhisa Hatano, Hiroshima (JP); Hidetaka Goto, Higashihiroshima (JP); Koutaro Takada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 35 days.

(21) Appl. No.: 16/817,923

(22) Filed: Mar. 13, 2020

(65) Prior Publication Data
US 2020/0381686 A1  Dec. 3, 2020

(30) Foreign Application Priority Data

May 30, 2019 (JP) .............................. JP2019-101635
Jan. 9, 2020 (JP) .............................. JP2020-002152

(51) Int. Cl.
*B60K 1/04* (2019.01)
*H01M 50/20* (2021.01)
*B60L 50/64* (2019.01)
*B60L 50/60* (2019.01)

(52) U.S. Cl.
CPC .............. *H01M 50/20* (2021.01); *B60L 50/64* (2019.02); *B60L 50/66* (2019.02); *H01M 2220/20* (2013.01)

(58) Field of Classification Search
CPC ........... B60L 50/64; B60L 50/66; B60K 1/04; H01M 50/20
See application file for complete search history.

(56) References Cited

U.S. PATENT DOCUMENTS

2019/0144048 A1* 5/2019 Frenzel ................. B60R 16/033
                                                                 296/1.03
2020/0381686 A1* 12/2020 Yamada ................. B60L 50/64

FOREIGN PATENT DOCUMENTS

JP       H10129369 A      5/1998
JP       2011251620 A    12/2011

\* cited by examiner

*Primary Examiner* — John D Walters
*Assistant Examiner* — James J Triggs
(74) *Attorney, Agent, or Firm* — Studebaker & Brackett PC

(57) ABSTRACT

A battery unit comprises plural battery modules and a battery case storing the plural battery modules, and is arranged over a range from a first storage area located below a front seat to second and third storage areas located in back of the front seat. The number of front-side fastening portions of the battery modules corresponding to the first storage area is set to be smaller than the number of rear-side fastening portions of the battery modules corresponding to the first storage area. The fastening portion is arranged on an inward side, in a vehicle width direction, of the fastening portion provided at an outward side in the vehicle width direction.

8 Claims, 13 Drawing Sheets

BATTERY UNIT MOUNTING STRUCTURE OF ELECTRIC VEHICLE

BACKGROUND OF THE INVENTION

The present invention relates to a battery unit mounting structure of an electric vehicle comprising a battery unit supporting a battery module and mounted at a pair of floor frames.

Conventionally, the battery unit is arranged in a space below a vehicle-body floor in the electric vehicle, such as a hybrid vehicle or an electric automotive vehicle, because a battery as a driving source of an electric motor (e.g., a motor generator or a motor) for driving wheels has a large capacity. The battery unit generally comprises plural battery modules of combined battery cells, such as lithium ion, a battery case which stores the plural battery modules, frames of the battery case, and others.

A battery mounting structure of an electric vehicle disclosed in Japanese Patent Laid-Open Publication No. 2011-251620 comprises a floor panel, a pair of right-and-left floor frames provided below the floor panel, each of which forms a closed-cross section extending longitudinally cooperatively with the floor panel, and a battery unit supporting battery modules and mounted at the pair of floor frames, wherein the battery unit comprises a lower-side cover member mounting the battery modules, an upper-side cover member covering over the lower-side cover member, and frames forming respective skeletons of the lower-side cover member and the upper-side cover member, and part of the plural battery modules are arranged in a front-side area of the frames in such a manner that their longitudinal direction extends in a vehicle width direction and the other part of the plural battery modules are arranged in a rear-side area of the frames in such a manner that their longitudinal direction extends in a vehicle longitudinal direction.

Vibration energy caused by a wheel running on a road surface is transmitted to a vehicle-body strength member through a suspension member and then vibrates a panel member, such as a floor panel forming a cabin, in a vehicle steady traveling. Traveling noises, such as drumming noise or road noise, are generated by the above-described vibration of the panel member. The drumming noise is a low-frequency sound of 20-50 Hz, and the road noise is a middle-frequency sound of 100-400 Hz. The drumming noise is sometimes called the road noise. These traveling noises, including the drumming noise and the road noise, may be suppressed by adding a damping material or increasing rigidity of a lower vehicle-body (see Japanese Patent Laid-Open Publication No. H10-129369, for example).

Since the road noise of the traveling noises causes the out-of-plane deformation (film vibration) of the floor panel, it is effective to increase the mounting rigidity of the battery modules. As shown in FIG. 13A, in a case where a left-side battery module BL and a right-side battery module BR are mounted at a left-half part and a right-half part of a vehicle-body lower portion, these battery modules BL, BR respectively rotate around rotational axial lines G which pass their gravity centers, so that the out-of-plane deformation of the floor panel is caused by their rotations. Therefore, the out-of-plane deformation of the floor panel is so suppressed that the road noise can be improved properly by increasing the mounting rigidity of the battery modules BL, BR and thereby suppressing their rotations around the respective rotational axial lines G.

Meanwhile, since the ride quality of the vehicle relates to the vibration damping performance which a passenger instinctively recognizes from a state of the floor panel, it is effective to decrease the mounting rigidity of the battery modules. The passenger can recognize the vibration damping performance of the vehicle more when the rolling of the vehicle caused by a steering operation of the passenger is greater, so that the ride quality improves. Herein, in the case where the left-side battery module BL and the right-side battery module BR are mounted at the left-half part and the right-half part of the vehicle-body lower portion, the rolling of the vehicle is promoted (increased) by making the battery modules BL, BR roll (rotate) integrally around a roll axial line R which extends longitudinally at a central point of these battery modules BL, BR as shown in FIG. 13B. Therefore, the vibration damping performance is so improved that the ride quality can be improved by decreasing the mounting rigidity of the battery modules BL, BR and thereby promoting the rolling of these battery modules BL, BR around the roll axial line R. That is, the road-noise improvement and the ride-quality improvement are conflicting requests in an aspect of the mounting rigidity of the battery modules.

SUMMARY OF THE INVENTION

Accordingly, an object of the present invention is to provide a battery unit mounting structure of an electric vehicle which can compatibly improve the road-noise performance and the ride-quality performance.

The present invention is a battery unit mounting structure of an electric vehicle, comprising a floor panel, a pair of right-and-left floor frames provided below the floor panel, each of which forms a closed-cross section extending longitudinally cooperatively with the floor panel, and a battery unit supporting plural battery modules and mounted at the pair of floor frames, wherein the battery unit comprises the battery modules and a battery case storing the plural battery modules and attached to the pair of floor frames, and mounting rigidity of part of the plural battery modules mounted at the battery case is set to be lower than that of other part of the plural battery modules mounted at the battery case so as to lower a peak of vibration amplitude which is defined as a vibration width, in a vertical direction, of an end portion, in a vehicle width direction, of the plural battery modules in a case where the floor panel vibrates at a frequency of 20-50 Hz and the plural battery modules roll around an axial line which extends in a vehicle longitudinal direction, passing a central point, in the vehicle width direction, of the plural battery modules.

According to the battery unit mounting structure of the electric vehicle of the present invention, since the battery unit comprises the battery modules and the battery case storing the plural battery modules and attached to the pair of floor frames, the battery modules can be firmly connected to the vehicle-body-side floor frames via the battery case. Further, since the mounting rigidity of part of the plural battery modules mounted at the battery case is set to be lower than that of other part of the plural battery modules mounted at the battery case so as to lower the peak of the vibration amplitude which is defined as the vibration width, in the vertical direction, of the end portion, in the vehicle width direction, of the plural battery modules in the case where the floor panel vibrates at the frequency of 20-50 Hz and the plural battery modules roll around the axial line which extends in the vehicle longitudinal direction, passing the central point, in the vehicle width direction, of the plural battery modules, the vibration damping performance of the vehicle can be improved by using the mounting rigidity of the part of the battery modules, and the road-noise performance of the vehicle can be suppressed by using the mounting rigidity of the other part of the battery modules.

In an embodiment of the present invention, the plural battery modules are supported in the same position and arranged in three or more rows extending in the vehicle width direction, and the mounting rigidity of the battery modules positioned at a one-end side row is set to be lower than that of the battery modules positioned at the other-end row.

According to this embodiment, the vibration damping performance can be improved by changing the mounting rigidity of the battery modules positioned at the one-end side row which may greatly affect the vehicle-body vibration.

In another embodiment of the present invention, the plural battery modules are supported in the same position and arranged in plural rows extending in the vehicle width direction, the battery modules positioned at a specified row are provided with plural mounting portions in a row direction, and mounting rigidity of the mounting portion positioned at an end side of the specified row is set to be lower than that of the mounting portion positioned at an inward side of the specified row.

According to this embodiment, the vibration damping performance can be improved by lowering (decreasing) the mounting rigidity of the mounting portion positioned at the end side of the specified row which may greatly affect the ride quality of the vehicle.

In another embodiment of the present invention, the mounting portion positioned at the end side of the specified row is formed on an inward side, in the vehicle width direction, of a mounting portion which the battery modules positioned at another row than the specified row is provided with and is positioned at an end side of the other row.

According to this embodiment, the vibration damping performance can be improved by a positional change of the mounting portions.

In another embodiment of the present invention, the mounting rigidity is lowered by reducing the number of the mounting portions of the battery modules.

According to this embodiment, the vibration damping performance can be improved by adjustment of the number of the mounting portions.

In another embodiment of the present invention, the battery unit is arranged over a range from a first position corresponding to a point located below a front seat to a second position corresponding to another point located in back of the first position, and the mounting rigidity of the battery module corresponding to the first position is set to be lower than that of the battery module corresponding to the second position.

According to this embodiment, the ride-quality performance of a passenger seated in the front seat can be improved intensively.

In another embodiment of the present invention, front-side mounting rigidity of the battery module corresponding to the first position is set to be lower than rear-side mounting rigidity of the battery module corresponding to the first position.

According to this embodiment, the vibration damping performance at a foot space of the passenger seated in the front seat which may greatly affect the ride-quality performance of the passenger seated in the front seat can be improved.

In another embodiment of the present invention, the battery module corresponding to the first position is provided with a smaller number of front-side mounting portions than rear-side mounting portions, and one of the front-side mounting portions which is positioned at an end side of the row is formed on an inward side, in the vehicle width direction, of one of the rear-side mounting portions which is positioned at the end side of the row.

According to this embodiment, the vibration damping performance at the foot space of the passenger seated in the front seat can be improved with a simple structure.

The present invention will become apparent from the following description which refers to the accompanying drawings.

BRIEF DESCRIPTION OF THE DRAWINGS

FIG. 11A showing the mounting-rigidity model of a first mounting bracket, FIG. 11B showing the mounting-rigidity model of a second mounting bracket, and FIG. 11C showing the mounting-rigidity model of a third mounting bracket.

FIG. 13A showing a move mode of the battery modules related to the road-noise performance, and FIG. 13B showing a move mode of the battery modules related to the ride-quality performance.

DETAILED DESCRIPTION OF THE INVENTION

Figure 1:
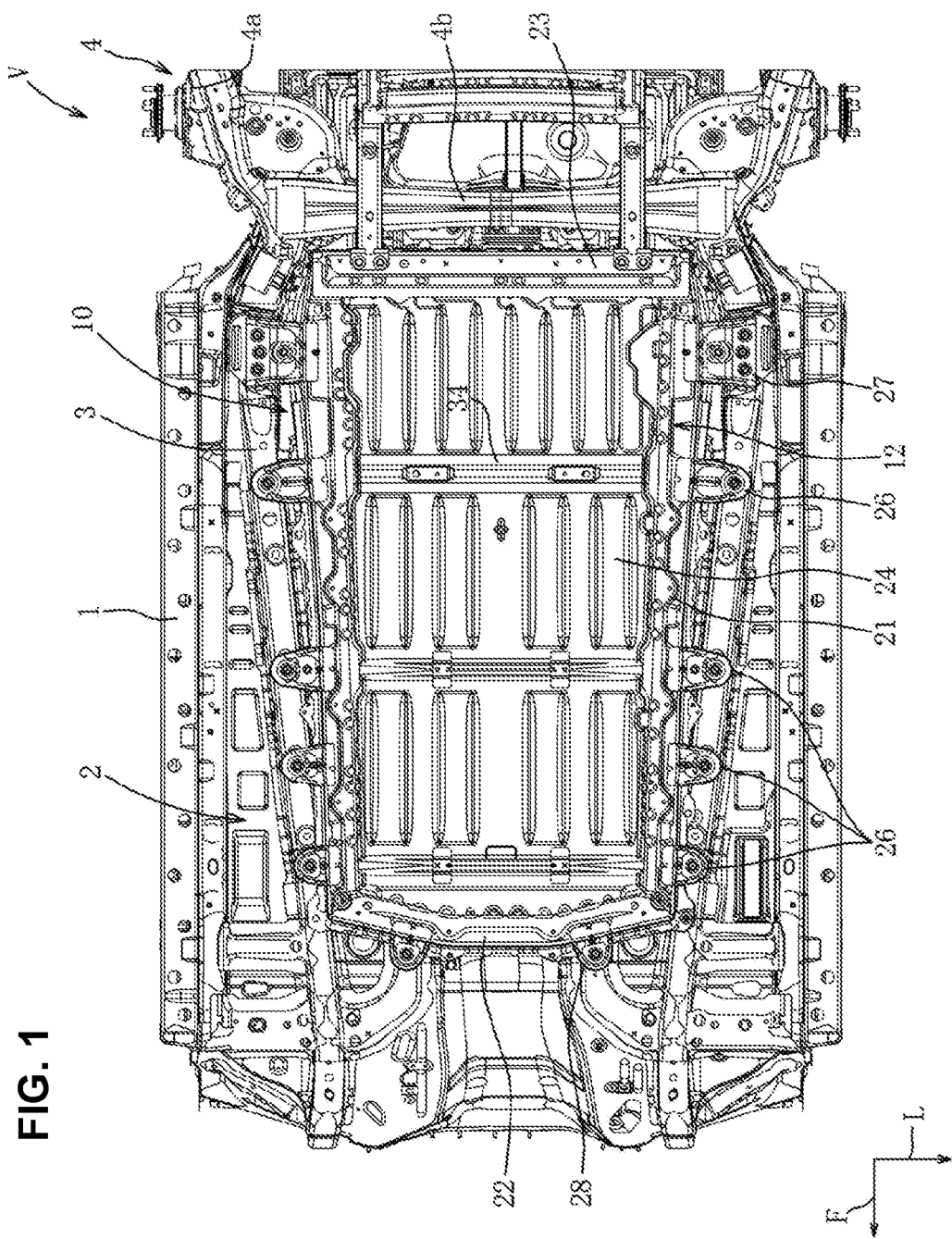
FIG. 1 is a bottom view of an electric vehicle according to an embodiment.

Hereafter, an embodiment of the present embodiment will be described referring to the drawings. The flowing description of the embodiment merely exemplify the present invention substantially, and therefore the present invention and its applications or uses should not be limited by the following description.

The embodiment of the present invention will be described referring to FIGS. 1-13. A vehicle V according to the present embodiment is a hybrid automotive vehicle provided with a driving source which combines an internal combustion engine (not illustrated), such as a gasoline or diesel engine and an electric motor (motor generator) for vehicle driving.

Figure 2:
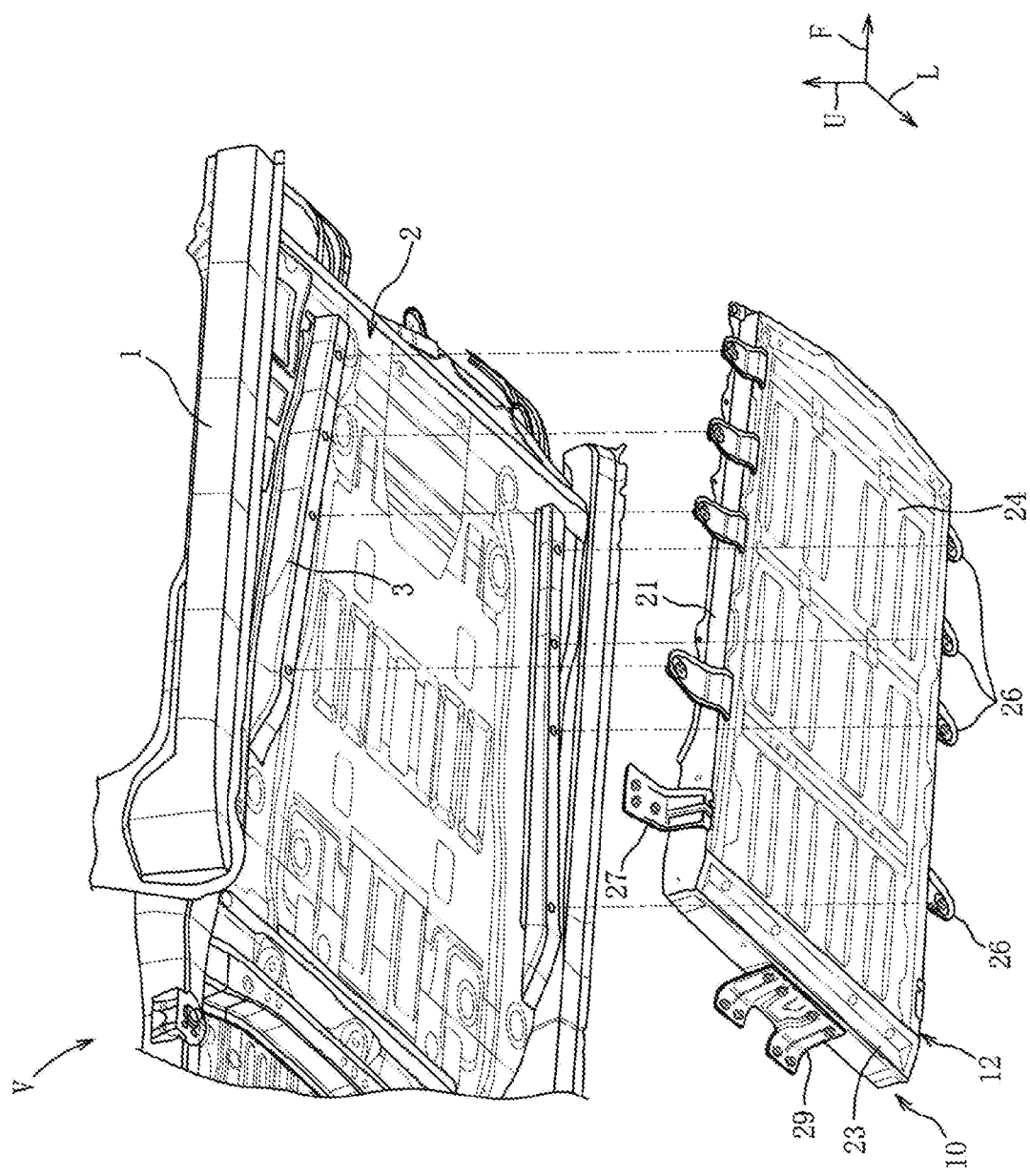
FIG. 2 is a perspective view of the electric vehicle, when viewed from a lower-rear side.

As shown in FIGS. 1 and 2, the vehicle V comprises a pair of right-and-left side sills 1 extending longitudinally, a floor panel 2, a pair of right-and-left floor frames 3 extending longitudinally, a battery unit 10, and others. In the figures, an arrow F shows a forward (front) side in a vehicle longitudinal direction, an arrow L shows a leftward (left) side in a vehicle width direction, and an arrow U shows an upward (upper) side in a vehicle vertical direction. The vehicle V is configured to be substantially symmetrical laterally.

A whole structure of the vehicle V will be described first. The side sill 1 comprises an outer panel which is configured to have a nearly hat-shaped cross section and forms an outside wall portion in the vehicle width direction and an inner panel which is configured to have a nearly hat-shaped cross section and forms an inside wall portion in the vehicle width direction, and these panels jointly form a nearly rectangular-shaped closed-cross section extending longitudinally. A hinge pillar extending vertically is connected to a front-end portion of the side sill 1, and a rear pillar extending vertically is connected to a rear-end portion of the side sill 1. Herein, the vehicle V has a door structure of a so-called double-hinged door type in which a front door is hinged to the hinge pillar at its front end portion and a rear door is hinged to the rear pillar at its rear end portion. Herein, a center pillar is not provided.

Figure 3:
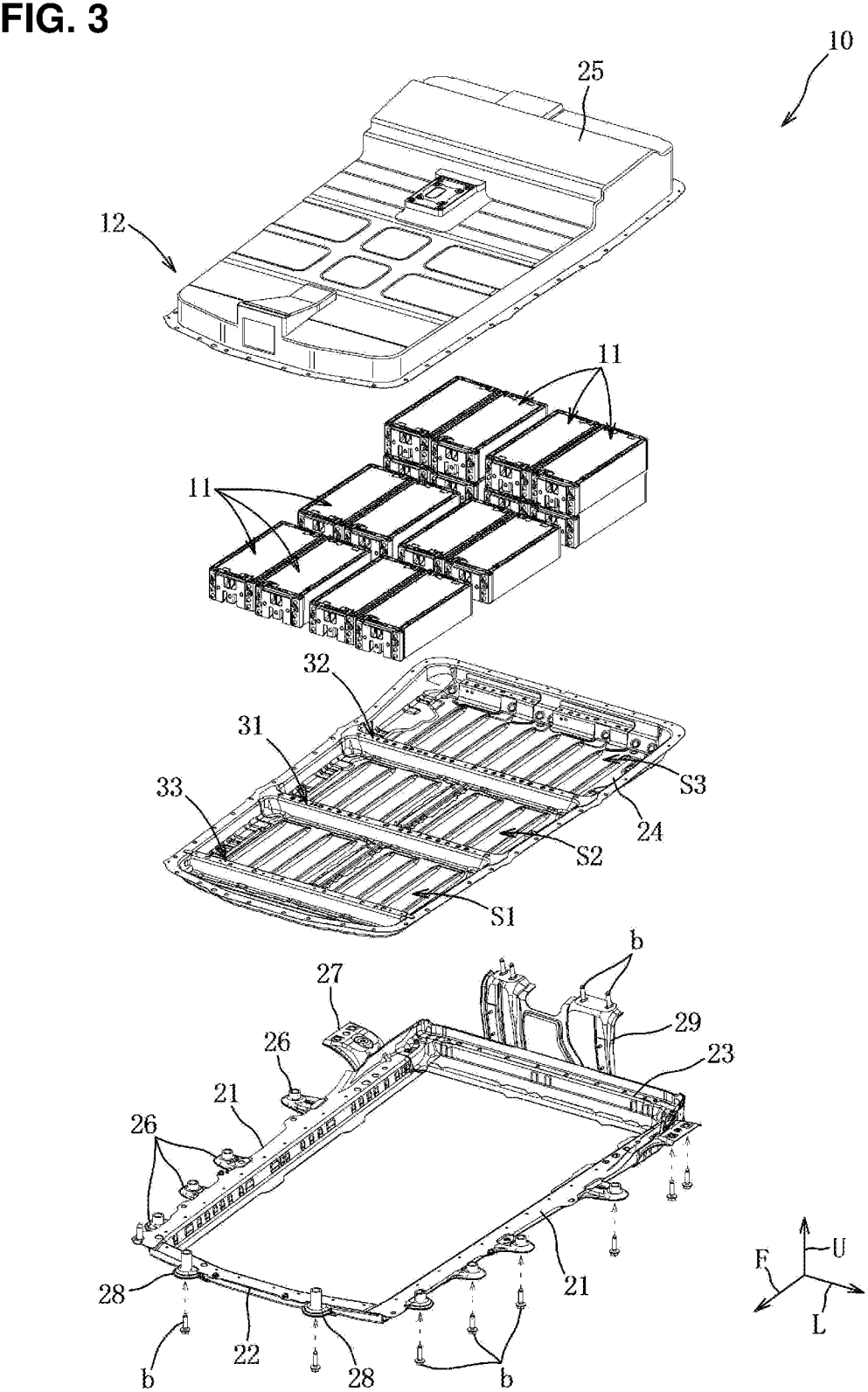
FIG. 3 is an exploded perspective view of a battery unit.

The floor panel 2 is fully flat such that it extends between the pair of side sills 1 and there is not provided a tunnel portion protruding toward an inside of a cabin. As shown in FIGS. 1, 2 and 3, the floor panel 2 comprises a front panel 2a where a seat for a front-seat passenger (not illustrated) is placed and a rear panel 2b where a seat for a rear-seat passenger (not illustrated) is placed. The rear panel 2b is connected to a rear end of the front panel 2a via a kick-up panel 2c which rises obliquely upwardly. Herein, a front right-side seat constitutes a driver's seat.

Each of the pair of floor frames 3 is configured to have a nearly hat-shaped cross section, and a distance between the pair of floor frames 3 increases as it goes rearwardly. Therefore, a distance between the side sill 1 and the floor frame 3 adjacent to this side sill 1 becomes closer as it goes rearwardly. The floor frame 3 forms a nearly rectangular-shaped closed-cross section extending longitudinally cooperatively with a lower surface of the floor panel 2a. A rear suspension 4 is arranged in back of the kick-up panel 2c and below the rear panel 2b. The rear suspension 4 is a torsion beam type of suspension which comprises a pair of right-and-left trailing arms 4a which rotatably support wheels (not illustrated) at their rear end portions and a torsion beam 4b which extends laterally and interconnects the pair of trailing arms 4a at both ends, in the vehicle width direction, thereof.

Next, the battery unit 10 will be described. As shown in FIGS. 1-3, the battery unit 10 is arranged in a space below the floor panel 2. The battery unit 10 comprises plural (e.g., sixteen) battery modules 11 and a battery case 12 which stores the battery modules 11. The battery module 11 which supplies a power to an electric motor for vehicle driving is configured as a rectangular-parallelepiped shaped battery assembly in which plural rectangular-parallelepiped shaped battery cells 11a (see FIG. 8) having specification voltage are arranged longitudinally in a layer shape. This battery cell 11a is a lithium ion battery, a kind of a secondary battery, for example. The plural battery modules 11 are formed in a uniform size (longitudinal, lateral, height), and are stored in the battery case 12 in such a manner that each longitudinal direction is parallel to the vehicle longitudinal direction. The weight of the battery module 11 is about 14 kg and the total weight of the battery unit 10 is about 300 kg, for example.

The battery case 12 is configured to secure the vibration resistance as well as the water resistance for a high-voltage battery where the battery modules 11 are connected in series. As shown in FIG. 3, the battery case 12 comprises a pair of right-and-left side frames 21, a front frame 22 which extends laterally and interconnects respective front end portions of the pair of side frames 21, a rear frame 23 which extends laterally and interconnects respective rear end portions of the pair of side frames 21, a tub-shaped battery tray 24 which is supported at the frames 21-23 and forms a bottom portion of the battery case 12, a synthetic-resin made cover member 25 which forms a sealed space for storing the plural battery modules 11 cooperatively with the battery tray 24, and so on. The bending rigidity, in the vertical direction, of the side frame 21 is set to be lower than that of the floor frame 3.

Figure 7:
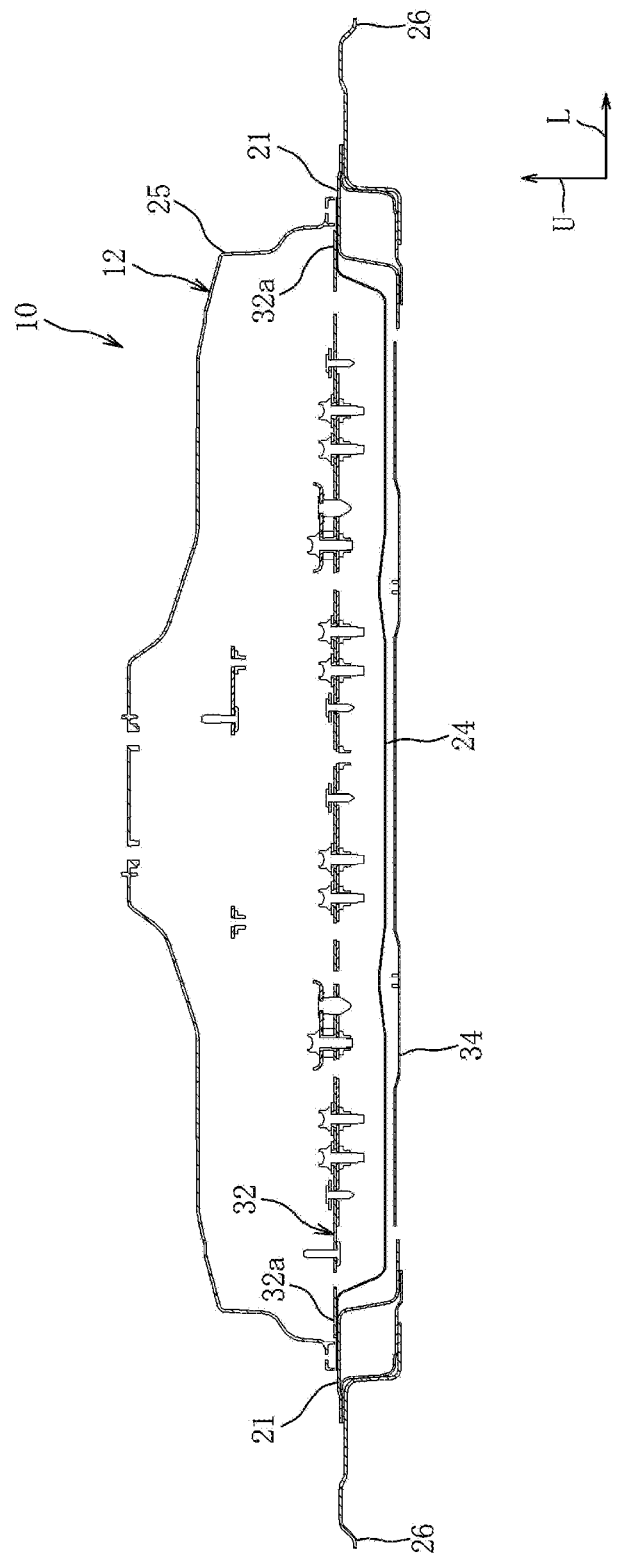
FIG. 7 is a sectional view taken along line VII-VII of FIG. 4.

Each of the frames 21-23 is configured to have a nearly rectangular-shaped closed-cross section which is formed by a lower panel having a nearly L-shaped cross section and an upper panel having a nearly L-shaped cross section (see FIG. 7). The closed-cross sections of the frames 21-23 are continuous in a ring shape such that the frames 21-23 form a ring-shaped closed-cross section structure. The frames 21-23 are attached to the vehicle body by attachment portions 26-29. Four pairs of right-and-left attachment portions 26 and a pair of right-and-left attachment portions 27 extend outwardly, in the vehicle width direction, from the respective lower panels of the pair of side frames 21, respectively. These attachment portions 26, 27 are fixedly fastened to lower wall portions of the floor frames 3 by molts b. A pair of right-and-left attachment portions 28 extend forwardly from the lower panel of the front frame 22, respectively. The attachment portions 28 are fixedly fastened to a lower surface of a front side portion of the front panel 2a by bolts b. The attachment portion 29 extends upwardly from a central portion of the lower panel of the rear frame 23 and its upper end portion is fixedly fastened to a cross member (not illustrated) which forms a closed-cross section extending laterally cooperatively with the rear panel 2b by bolts b.

Figure 4:
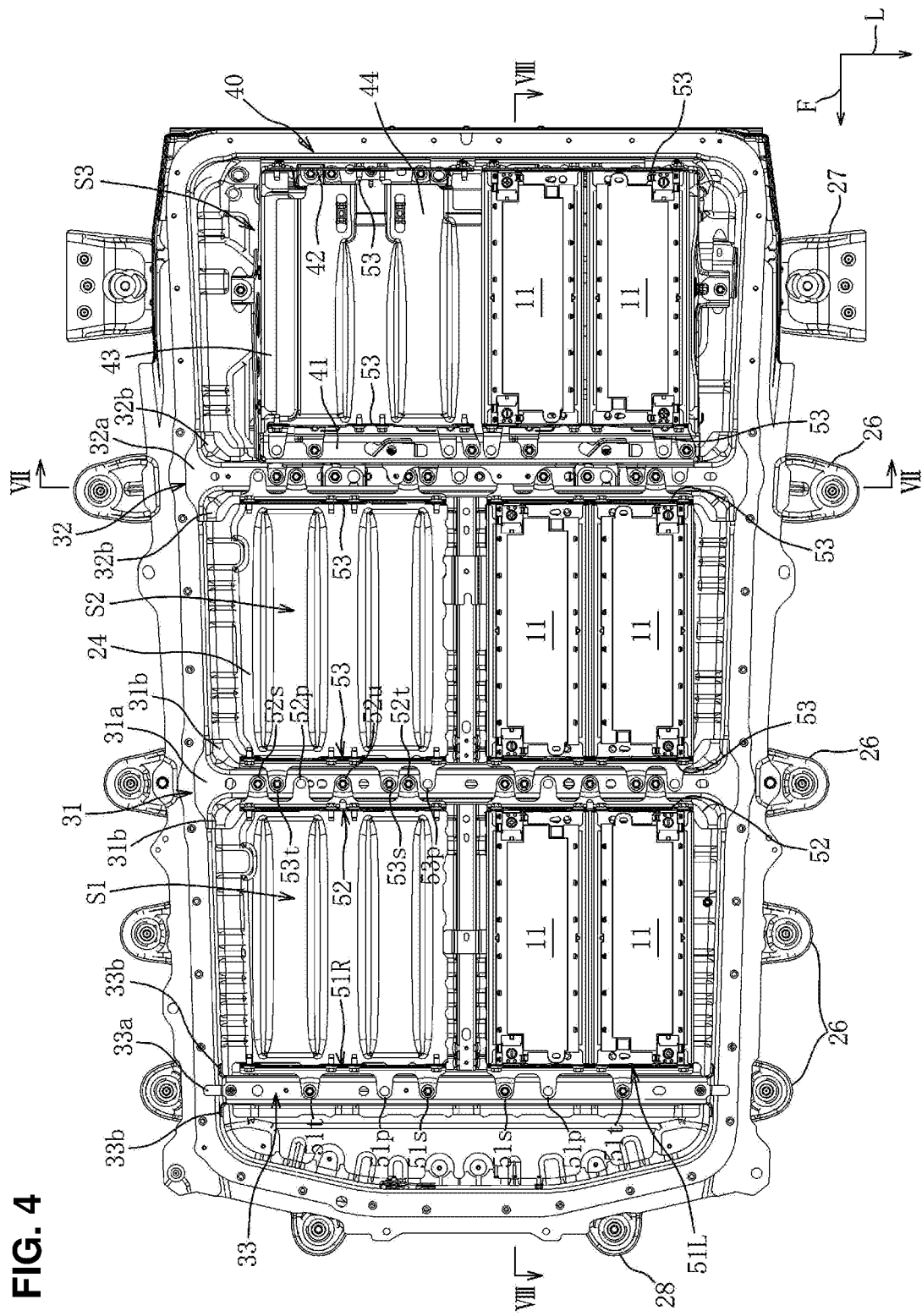
FIG. 4 is a plan view of the battery unit without a cover member and right-side battery modules.
Figure 5:
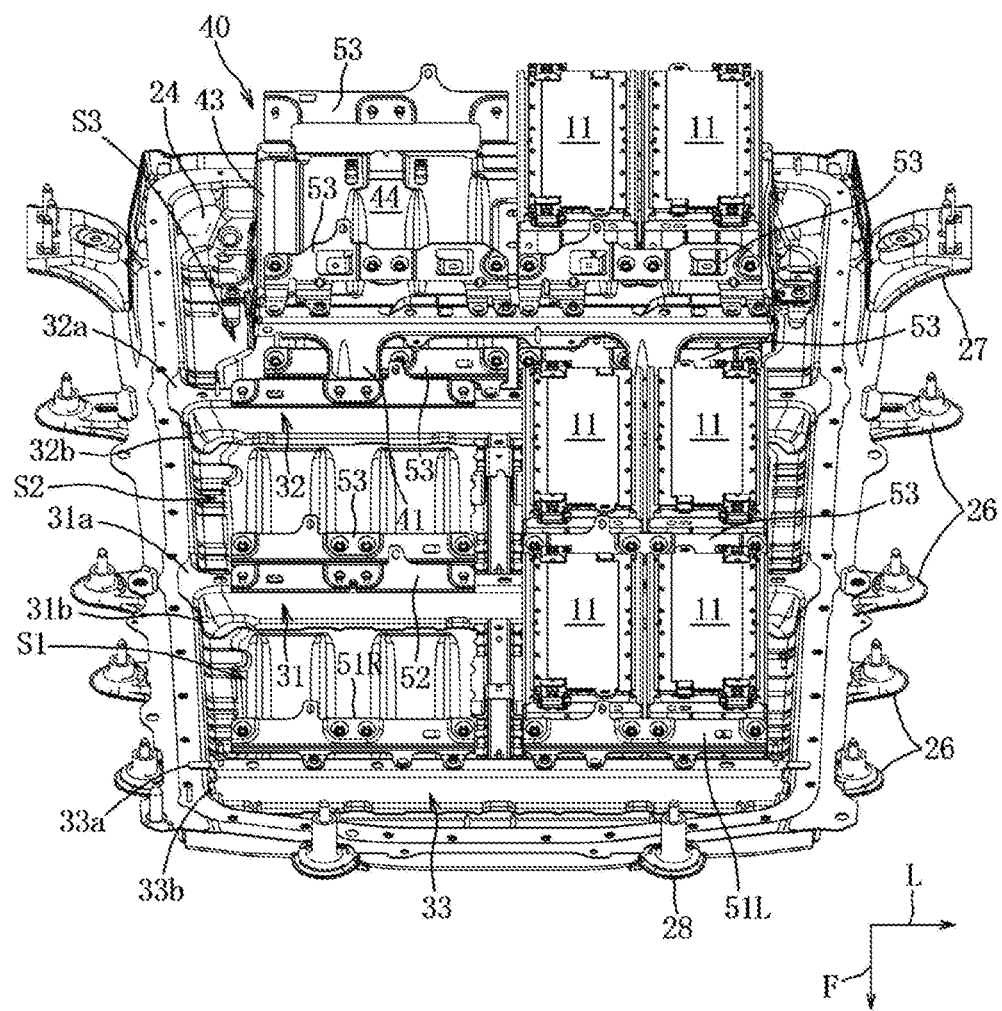
FIG. 5 is a perspective view of the battery unit without the cover member and the right-side battery modules, when viewed from an upper-front side.

As shown in FIGS. 3-5, the battery tray 24 is firmly welded in a state where it is placed on respective upper wall portions of the frames 21-23. A plate-shaped rubber member (not illustrated) is provided between the battery tray 24 and the battery modules 11. Thereby, a distance between the battery tray 24 and the battery modules 11 is configured to be changeable.

The battery tray 24 is configured to have first-third storage areas (battery storage areas) S1-S3 storing the battery modules 11 which is partitioned by first-third cross frames 31-33, respectively, having a nearly hat-shaped cross section. The third and first cross frames 33, 31 partition a longitudinal range of the first storage area S1 which corresponds to a lower side of a front part (a seat for front seat's passenger) of the floor panel 2a, the first and second cross frames 31, 32 partition a longitudinal range of the second storage area S2 which corresponds to a lower side of a rear part of the floor panel 2a, and the second cross frame 32 and the rear frame 23 partition a longitudinal range of the third storage area S3 which corresponds to a lower side of the kick-up panel 2c and the rear panel 2b. The first and second storage areas S1, S2 respectively store the four battery modules 11 such that these battery modules 11 are aligned laterally in a single-layer state.

Figure 6:
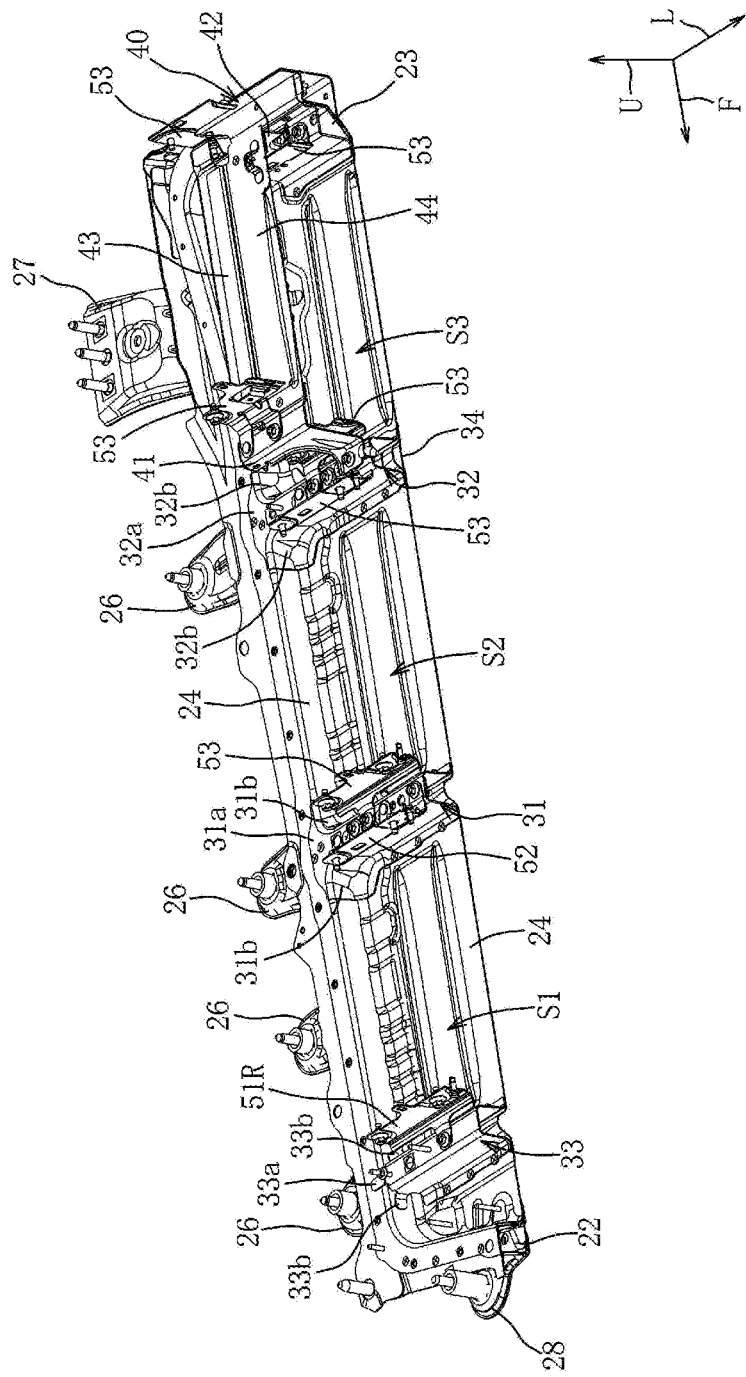
FIG. 6 is a perspective sectional view of a major part of FIG. 4.

The third storage area S3 has a two-stage supporting mechanism 40. That is, this third storage area S3 stores the eight battery modules 11 such that the lower-side four battery modules 11 are aligned laterally and the upper-side four battery modules 11 are aligned laterally above the lower-side four battery modules 11. As shown in FIGS. 4-6, the two-stage supporting mechanism 40 comprises a nearly i-shaped front support portion 41, a nearly π-shaped rear support portion 42, a pair of right-and-left nearly T-shaped side support portions 43 which interconnect respective right-and-left end portions of the front support portion 41 and the rear support portion 42, a bottom-plate member 44 which extends over the support portions 41-43, and others, which supports the upper-side four battery modules 11. A pair of right-and-left leg parts of the front support portion 41 are fixedly fastened to the upper wall portion of the second cross frame 32, and a pair of right-and-left leg parts of the rear support portion 42 are fixedly fastened to the upper wall portion of the rear frame 23. Leg parts of the pair of side support portions 43 are fixedly fastened to onto the battery tray 24.

Each of the first-third cross frames 31-33 forms a closed-cross section extending laterally above the battery tray 24 cooperatively with the battery tray 24. These first-third cross frames 31-33 are configured to have substantially the same bending rigidity, in the vertical direction, as the side frame 21, and arranged in the longitudinal direction substantially regular intervals.

As shown in FIGS. 4-6, the first cross frame 31 comprises upper-wall connection portions 31a which respectively extend outwardly, in the vehicle width direction, from right-and-left both end portions of its upper wall portion and a pair of front-and-rear side-wall connection portions 31b which respectively extend forwardly and rearwardly from respective right-and-left both end portions of its front wall portion and its rear wall portion. The upper-wall connection portion 31a is connected to the upper wall portion of the side frame 21, and the pair of side-wall connection portions 31b are connected to an inside wall portion of the side frame 21, respectively. The upper-wall connection portion 31a and the pair of side-wall connection portion 31b are formed integrally. The third cross frame 33 comprises upper-wall connection portions 33a which respectively extend outwardly, in the vehicle width direction, from right-and-left both end portions of its upper wall portion and a pair of front-and-rear side-wall connection portions 33b which respectively extend forwardly and rearwardly from respective right-and-left both end portions of its front wall portion and its rear wall portion. The upper-wall connection portion 33a is connected to the upper wall portion of the side frame 21, and the pair of side-wall connection portions 33b are connected to an inside wall portion of the side frame 21, respectively. The upper-wall connection portion 33a and the pair of side-wall connection portion 33b are formed separately.

The second cross frame 32 comprises upper-wall connection portions 32a which respectively extend outwardly, in the vehicle width direction, from right-and-left both end portions of its upper wall portion and a pair of front-and-rear side-wall connection portions 32b which respectively extend forwardly and rearwardly from respective right-and-left both end portions of its front wall portion and its rear wall portion. The upper-wall connection portion 32a is connected to the upper wall portion of the side frame 21, and the pair of side-wall connection portions 32b are connected to an inside wall portion of the side frame 21, respectively. The upper-wall connection portion 32a and the pair of side-wall connection portion 32b are formed integrally. As shown in FIGS. 1, 6-8, a lower-side cross frame 34 extending laterally is provided at a lower surface of the battery tray 24. The lower-side cross frame 34 forms a closed-cross section extending laterally cooperatively with the battery tray 24 below the battery tray 24. The closed-cross section formed by the lower-side cross frame 34 is positioned vertically adjacently to the closed-cross section formed by the second cross frame 32, interposing the battery tray 24.

The battery modules 11 are mounted at the first-third cross frames 31-33 and the rear frame 23 by a pair of front-and-rear metal-plate made mounting brackets 51R, 51L, 52, 53. Hereafter, since the mounting brackets 51R, 51L are configured to be laterally symmetrical, these will be described as a first mounting bracket 51 in a case where it is unnecessary to distinguish these. The bending rigidity, in the vertical direction, of the mounting brackets 51-53 are set to be higher than that of the battery tray 24 and be lower than that of the first-third cross frames 31-33.

Figure 8:
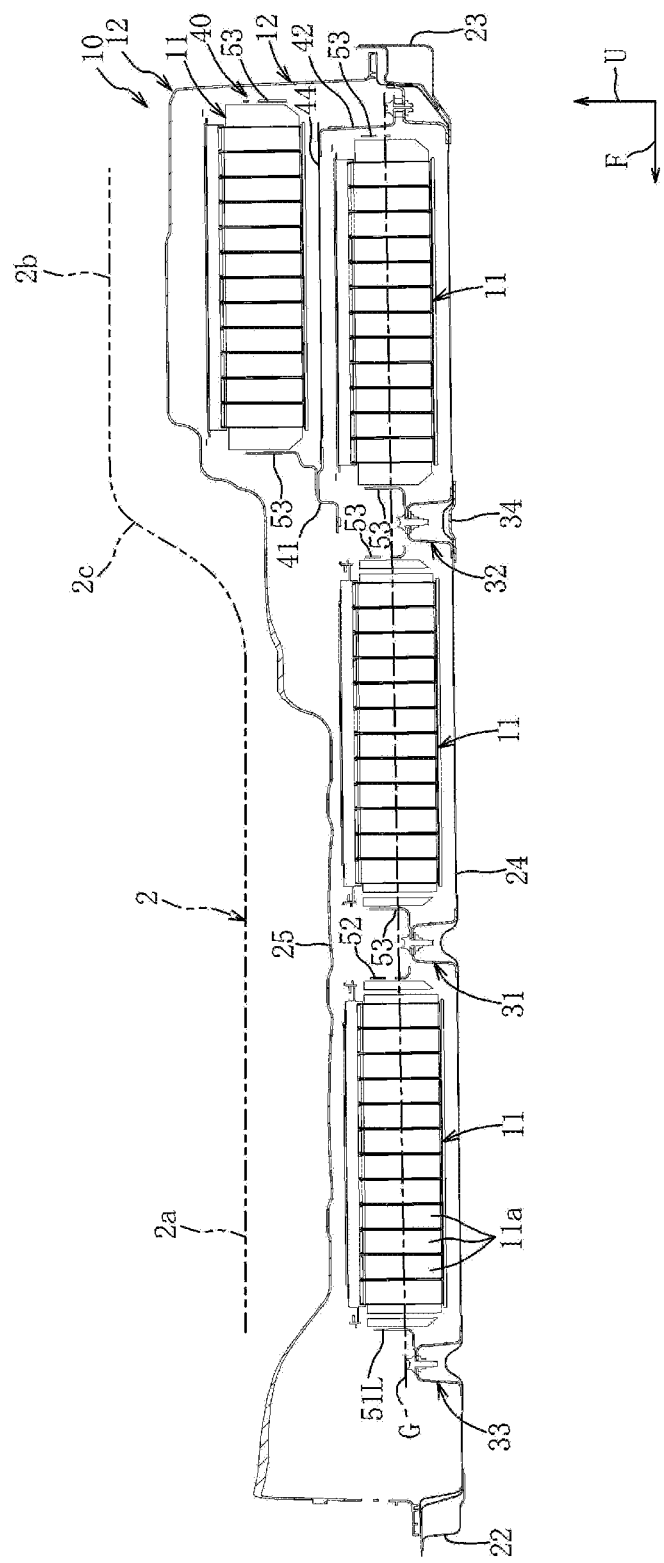
FIG. 8 is a sectional view taken along line VIII-VIII of FIG. 4.
Figure 9A:
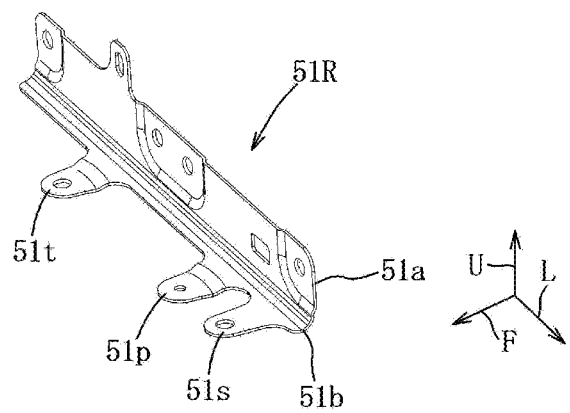
FIGS. 9A, 9B and 9C are perspective views of first-third mounting brackets.
Figure 9B:
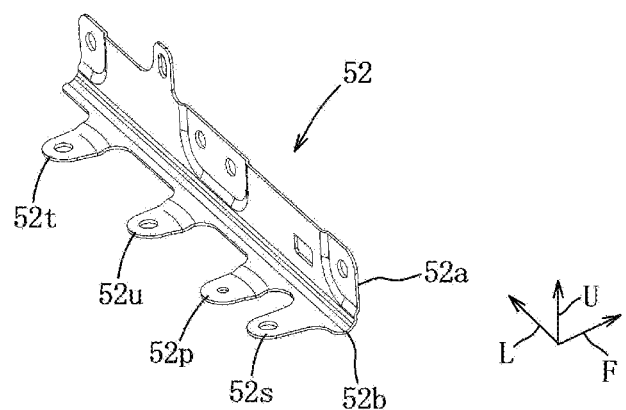
Figure 9C:
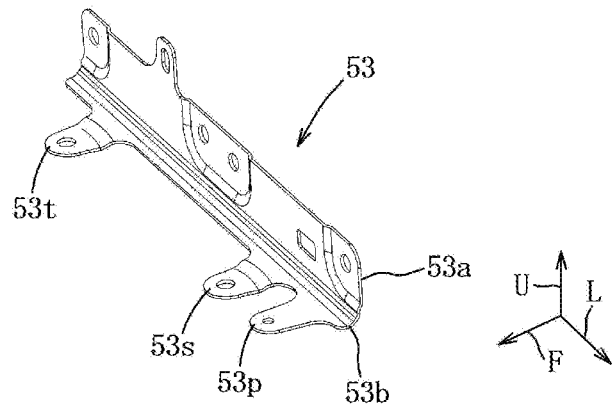

As shown in FIGS. 9A-9C, the mounting brackets 51R, 52, 53 comprise connecting wall portions 51a-53a which extend vertically and are connected to the battery modules 11 and fixing wall portions 51b-53b which extend longitudinally and are connected by fastening members, and are configured to have a nearly L-shaped cross section. The connecting wall portions 51a, 53a of the mounting brackets which are mounted at a front side of the battery modules 11 are connected to front wall portions of the two laterally-adjacent battery modules 11 by four bolts, and the connecting wall portions 52a, 53a of the mounting brackets which are mounted at a rear side of the battery modules 11 are connected to rear wall portions of the two laterally-adjacent battery modules 11 by four bolts. Further, as shown in FIG. 8, the connecting wall portions 51a-53a of the mounting brackets S1-53 are connected to the battery modules 11 such that a center of gravity (the rotational axial line G) of each of the battery modules 11 is located substantially at the same level as each of the upper wall portions of the first-third cross frames 31-33 and the rear frame 23.

The right-and-left first mounting brackets 51L, 51R fixed to the third cross frame 33 and the right-and-left second mounting brackets 52 fixed to the first cross frame 31 are provided in the first storage area S1.

As shown in FIG. 9A, the first mounting bracket 51R is made by pressing 1.6 mm steel plate, for example, and comprises the connecting wall portion 51a and the fixing wall portion 51b. The fixing wall portion 51b is provided with a fastening portion 51s which extends forwardly (in an opposite direction to a bending part) at its left-side end portion. Further, a poisoning portion 51p extending forwardly is formed at a portion of the fixing wall portion 51b which is located between a central part of the fixing wall portion 51b and a left-side end part of the fixing wall portion 51b and also slightly closer to the central part of the fixing wall portion 51b, and a fastening portion 51t extending forwardly is formed at another portion of the fixing wall portion 51b which is located at a symmetrical position to the positioning portion 51p relative to the central part of the fixing wall portion 51b. The fixing wall portion 51b extends forwardly from the fixing wall portion 51b, and the fastening portion 51s and the fastening portion 51t are fixed to the upper wall portion of the third cross frame 33 by bolts. Herein, the left-side first mounting bracket 51L which corresponds to a lower side of a driver's assistant seat is laterally symmetrical to the right-side first mounting bracket 51R (see FIG. 4).

As shown in FIG. 9B, the second mounting bracket 52 is made by pressing 1.6 mm steel plate, for example, and comprises the connecting wall portion 52a and the fixing wall portion 52b. The fixing wall portion 52b is provided with a fastening portion 52s which extends rearwardly at its right-side end portion. Further, a fastening portion 52u extending rearwardly from a central part of the fixing wall portion 52b is provided, a positioning portion 52p extending rearwardly from a slightly-rightward position relative to a center between the fastening portion 52s and the fastening portion 52u is formed, and a fastening portion 52t extending rearwardly from a symmetrical position to the positioning portion 52t relative to the fastening portion 52u is formed. The fixing wall portion 52b extends rearwardly from a bending part, and the fastening portion 52s, the fastening portion 52t, and the fastening portion 52u are fixed to the upper wall portion of the first cross frame 31 by bolts.

The right-and-left third mounting brackets 53 fixed to the first cross frame 31 and the right-and-left third mounting brackets 53 fixed to the second cross frame 32 are provided in the second storage area S2.

As shown in FIG. 9C, the third mounting bracket 53 fixed to the first cross frame 31 is made by pressing 2.0 mm steel plate, for example, and comprises the connecting wall portion 53a and the fixing wall portion 53b. The fixing wall portion 53b is provided with a positioning portion 53p which extends forwardly at its left-side end portion. Further, a fastening portion 53s extending forwardly from a slightly-leftward position relative to a center between a central part of the fixing wall portion 53b and a left-side end part of the fixing wall portion 53b is formed, and a fastening portion 53t extending forwardly from a symmetrical position to the fastening portion 53s relative to a central part of the fixing wall portion 53b is formed. Herein, the left-side third mounting bracket 53 fixed to the first cross frame 31 and the pair of right-and-left third mounting brackets 53 fixed to the second cross frame 32 are configured similarly except an arrangement position thereof.

The pair of right-and-left third mounting brackets 53 fixed to the second cross frame 32 and the pair of right-and-left third mounting brackets 53 fixed to the rear frame 23 are arranged at a lower stage of the third storage area S3 similarly to the second storage area S2. Further, at an upper stage of the third storage area S3 are arranged the pair of right-and-left third mounting brackets 53 fixed to the front support portion 41 and the pair of right-and-left third mounting brackets 53 fixed to the rear support portion 42 similarly to the lower stage of the third storage area S3. The twelve battery modules 11 stored in the second and third storage areas S2, S3 are mounted at the cross frames 31, 32 and the rear frame 23 by six pairs of front-and-rear third mounting brackets 53, so that each of the battery modules 11 has the same mounting rigidity.

Hereafter, an idea (concept) of the mounting rigidity of the battery modules 11 will be described. The mounting rigidity of the battery modules 11 means the rigidity of mounting the battery modules 11 by means of the first-third mounting brackets 51-53. Therefore, in the present embodiment, the mounting rigidity of the battery modules 11 is set (adjected) by the plate thickness and/or the fixing manner of the first-third mounting brackets 51-53. The mounting rigidity of the battery modules 11 is increased by thickening the plate thickness of the first-third mounting brackets 51-53, and also the mounting rigidity of the battery modules 11 is adjusted by changing the fixing manner of the first-third mounting brackets 51-53.

Figure 10:
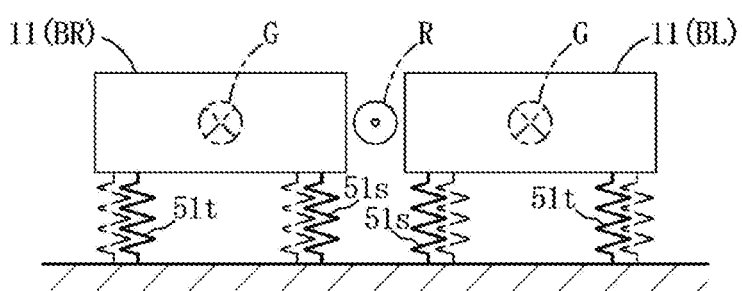
FIG. 10 is an explanatory diagram regarding mounting rigidity of the battery modules.
Figure 11A:
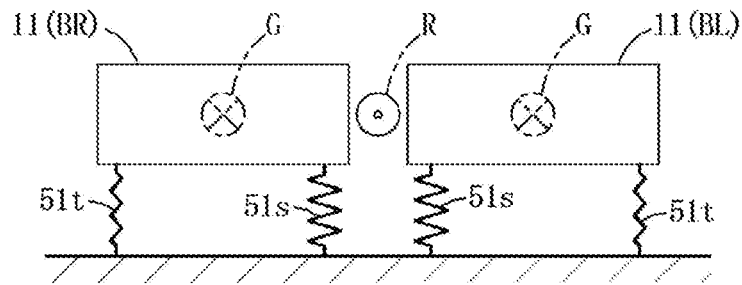
FIGS. 11A-11C show models of the battery unit of the present embodiment.
Figure 11B:
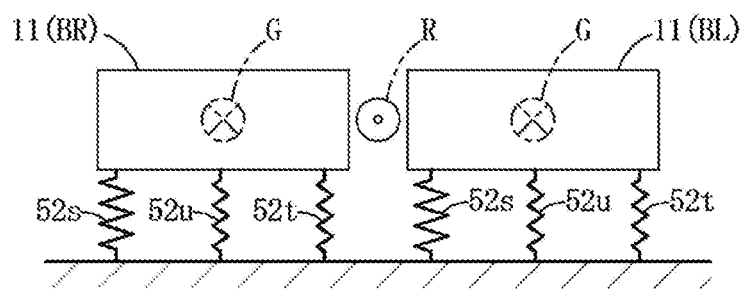
Figure 11C:
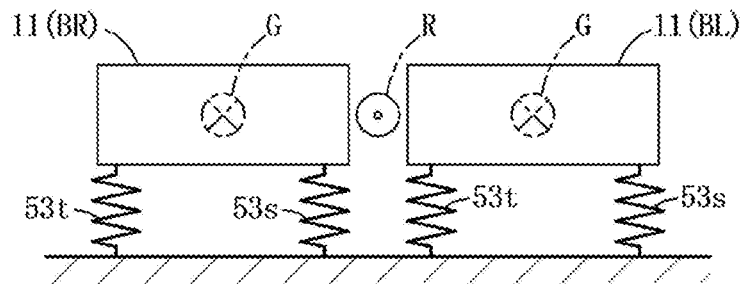

An example of changing the position of the fastening portion as the changing of the fixing manner will be described. This is a case where the fastening portions 51s, 51t of the first mounting bracket 51 are moved inwardly, in the vehicle width direction, relative to the third cross frame 33. As shown in FIG. 10, in a case where the fastening portions 51s, 51t of the first mounting brackets 51L, 51R are changed from a position shown by an imaginary lines to another position shown by a solid line, the fastening portion 51t moves inwardly in the vehicle width direction, so that the apparent mounting rigidity of an outward-side portion, in the vehicle width direction, of the battery module 11 decreases (lowers). Further, the fastening portion 51s moves inwardly in the vehicle width direction, so that the apparent mounting rigidity of an inward-side portion, in the vehicle width direction, of the battery module 11 increases. Herein, the first-third mounting brackets 51-53 are designed substantially similarly except the plate thickness, the position of the fastening portion, and the position of the positioning portion. Further, reference character R denotes a roll axial line which extends at a central point of the left-side battery module 11 (BL) and the right-side battery module 11 (BR), and reference character G denotes a rotational axial line which passes the gravity center of each battery module 11 to which the first mounting brackets 51L, 51R are integrally connected.

The right-side first mounting bracket 51R has the same plate thickness as the right-side second mounting bracket 52, and the distance between its left end portion and its fastening portion 51s is smaller than that between the fastening portion 52t and a left end portion of the right-side second mounting bracket 52. Further, the distance between its right end portion and its fastening portion 51t is larger than that between the fastening portion 52s and a right end portion of the right-side second mounting bracket 52. Accordingly, the first mounting bracket 51 has the lower mounting rigidity of the battery module 11 than the second mounting bracket 52, which is represented by a mounting rigidity model shown in FIG. 11A.

The right-side second mounting bracket 52 has the thinner plate thickness than the right-side third mounting bracket 53, and the distance between its left end portion and its fastening portion 52t is equal to that between the fastening portion 53s and a left end portion of the right-side third mounting bracket 53. Further, while the distance between its right end portion and its fastening portion 52s is smaller than that between the fastening portion 53t and a right end portion of the right-side third mounting bracket 53, the plate thickness of the right-side second mounting bracket 52 is thinner than that of the third mounting bracket 53, so that the second mounting bracket 52 has substantially the same mounting rigidity of the battery module 11 as the third mounting bracket 53, which is represented by a mounting rigidity model shown in FIG. 11B. The third mounting bracket 53 has the thicker plate thickness than the first and second mounting brackets 51, 52, and the distance between its left end portion and its fastening portion 553s is equal to that between its fastening portion 53t and its right end portion, which is represented by a mounting rigidity model shown in FIG. 11C.

The four battery modules 11 stored in the first storage area S1 are mounted at the third and first cross frames 33, 31 by the two pairs of front-and-rear first and second mounting brackets 51, 52. Since the first and second mounting brackets 51, 52 have the different plate thickness and the fixing shape from the third mounting bracket 53, the mounting rigidity of the battery modules 11 stored in the first storage area S1 is different from that of the battery modules stored in the second and third storage areas S2, S3, and also the natural frequency of the battery modules 11 stored in the first storage area S1 is different from that of the battery modules stored in the second and third storage areas S2, S3. Accordingly, even in a case where all of the battery modules 11 are respectively stored in the same position, resonance of vibration of the battery unit 10 and vibration of the vehicle body at a middle-frequency band is suppressed.

Further, an area in front of the first storage area S1 where the first mounting bracket 51 is arranged corresponds to a foot space of the passenger seated in the front seat. In the first mounting bracket 51, the distance between an outward end portion, in the vehicle width direction, of the first mounting bracket 51 and the fastening portion 51*t* is set to be longer than the distance between an inward end portion, in the vehicle width direction, of the first mounting bracket 51 and the fastening portion 51*s*, so that the mounting rigidity of a part of the battery module 11 which is positioned on the outward side, in the vehicle width direction, of the first mounting bracket 51 is lowered relatively. That is, rolling of the battery modules 11, to which the first mounting brackets 51L, 51R are integrally connected, around the roll axial line R is promoted, so that the vibration damping performance perceived by the passenger seated in the front seat is improved. Herein, since the fastening portion 51*t* is spaced further inwardly apart from the outward end portion, in the vehicle width direction, of the battery module 11 than the fastening portions 52*s*, 52*t*, 53*s*, 53*t* arranged at the outward side of the second and third mounting brackets 52, 53, the ride quality of the passenger seated in the front seat is improved because of a minimum decrease of the mounting rigidity of the battery modules 11.

Hereafter, the function/effects of the above-described battery unit mounting structure will be described. The simulation analysis by the CAE (Computer Aided Engineering) was conducted. A vehicle model A (evaluation standard model) where all of the battery modules 11 stored in the first-third storage areas S1-S3 are mounted by the third mounting brackets 53 and a vehicle model B according to the present embodiment were prepared, and the analysis of the vibration damping performance (inertance) of the front panel 2*a* was conducted.

Figure 12:
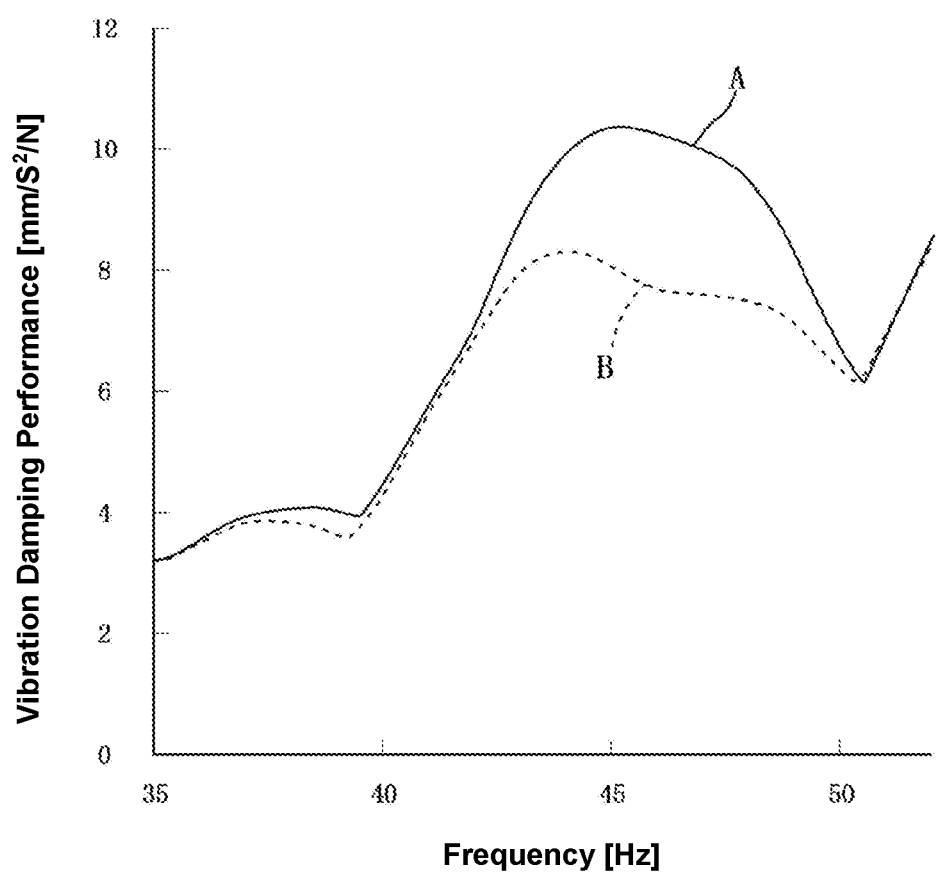
FIG. 12 shows analysis results regarding the vibration damping performances of the model of the present embodiment and an evaluation standard model.
Figure 13A:
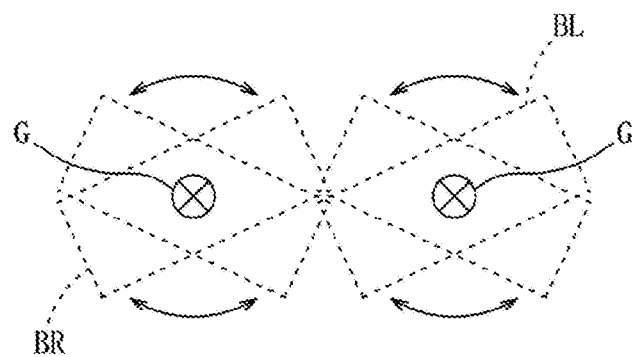
FIGS. 13A and 13B show moves of the battery modules.
Figure 13B:
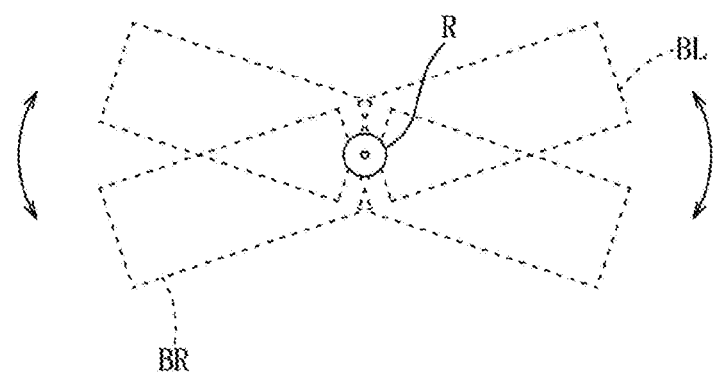

FIG. 12 shows analysis results. As shown in FIG. 12, it was found that the vibration damping performance of the vehicle model B was improved in all frequency ranges compared to the vehicle model A, so that the vibration damping performance (the ride quality) perceived by the passenger seated in the front seat was improved. Particularly, the peak of the vibration amplitude of the vehicle model B was lowered greatly in the range of 40-50 Hz which relates to the drumming noise, so that improvement of the vibration damping performance perceived by the passenger seated in the front seat was remarkable in this range. Herein, in the present embodiment, a low-frequency sound of 20-50 Hz considered as the drumming noise, and a middle-frequency sound of 100-400 Hz is considered as the road noise.

According to the battery unit mounting structure of the above-described present embodiment, since the battery unit 10 comprises the battery modules 11 and the battery case 12 storing the plural battery modules 11 and attached to the pair of floor frames 3, the battery modules 11 can be firmly connected to the vehicle-body-side floor frames 3 via the battery case 12. Further, since the mounting rigidity of the battery modules 11 which is mounted in the first storage area S1 of the battery case 12 is set to be lower than that of the battery modules 11 which is mounted in the second and third storage area S2, S3 of the battery case 12 so as to lower the peak of the vibration width in the case where the floor panel 2 vibrates at the frequency of 20-50 Hz and the battery modules 11 roll around the roll axial line R extending in the vehicle longitudinal direction, passing the central point, in the vehicle width direction, of the battery modules 11, the vibration damping performance of the vehicle V can be improved by using the mounting rigidity of part of the battery modules 11, and the road-noise performance of the vehicle V can be suppressed by using the mounting rigidity of the other part of the battery modules 11.

Since the plural battery modules 11 are supported in the same position and arranged in three or more rows extending in the vehicle width direction, and the mounting rigidity of the battery modules 11 positioned at a one-end side row (the first storage area S1) is set to be lower than that of the battery modules 11 positioned at the other-end row (the second and third storage areas S2, S3), the vibration damping performance can be improved by changing the mounting rigidity of the battery modules 11 positioned at the one-end side row which may greatly affect the vehicle-body vibration.

Since the plural battery modules 11 are supported in the same position and arranged in plural rows extending in the vehicle width direction, the battery modules 11 positioned at the foremost row are provided with the plural mounting portions (the fastening portions 51*s*, 51*t*) in the row direction, and the mounting rigidity of the mounting portion (the fastening portion 51*t*) positioned at an end side of this row is set to be lower than that of the mounting portion (the fastening portion 51*s*) positioned at an inward side of this row, the vibration damping performance can be improved by lowering the mounting rigidity of the mounting portion positioned at the end side of the row which may greatly affect the ride quality of the vehicle V.

Since the fastening portion 51*t* positioned at the outward end side, in the vehicle width direction, of the first storage area S1 of the foremost row is formed on the inward side, in the vehicle width direction, of the mounting portions 52*s*, 52*t*, 53*s*, 53*t* positioned at the outward end side, in the vehicle width direction, of the second and third storage areas S2, S3, the vibration damping performance can be improved by a positional change of the mounting portions.

Since the mounting rigidity of the battery modules 11 positioned in front of the first storage area S1 is lowered by reducing the number of the mounting portions of the battery modules 11, the vibration damping performance can be improved by adjustment of the number of the mounting portions.

Since the battery unit 10 is arranged over a range from the first storage area S1 corresponding to the point located below the front seat to the second and third storage areas S2, S3 corresponding to the point located in back of the front seat, and the mounting rigidity of the battery modules 11 corresponding to the front side portion of the first storage area S1 is set to be lower than that of the battery modules 11 corresponding to the second and third storage areas S2, S3, the ride-quality performance of the passenger seated in the front seat can be improved intensively.

Since the front-side mounting rigidity of the battery modules 11 corresponding to the first storage area S1 is set to be lower than the rear-side mounting rigidity of the battery modules 11 corresponding to the first storage area S1, the vibration damping performance at the foot space of the passenger seated in the front seat which may greatly affect the ride-quality performance of the passenger seated in the front seat can be improved.

Since the battery modules 11 corresponding to the first storage area S1 are provided with the smaller number of the front-side mounting portions than the rear-side mounting portions, and the fastening portion 51*t* which is the front-side mounting portion positioned at the end side of the row is formed on the inward side, in the vehicle width direction, of the fastening portion 52*s* (52*t*) which is the rear-side mounting portions positioned at the end side of the row, the vibration damping performance at the foot space of the passenger seated in the front seat can be improved with a simple structure.

Next, some modifications where the above-described embodiment is partially modified will be described.

1] While the above-described embodiment described a case where there were provided the first-third storage areas S1-S3, two storage areas or four or more storage areas may be provided. Further, while the case where the two-stage supporting mechanism 40 was provided in the third storage area S3 was described, three or more stage supporting mechanism may be provided and also two or more stage supporting mechanism may be provided in the second storage area S2 as well.

2] While the above-described embodiment described a case where the first mounting bracket 51 was provided at the front side of the first storage area S1 and the second mounting bracket 52 was provided at the rear side of the first storage area S1, the first mounting bracket 51 may be provided at the front-and-rear both sides. In this case, the peak of the vibration width is lowered by setting such that the number of fastening portions of the first storage area S1 is smaller than the number of fastening portions of the second and third storage areas S2, S3, or the plate thickness of the mounting bracket of the first storage area S1 is thinner than the plate thickness the mounting brackets of the second and third storage areas S2, S3.

3] While the above-described embodiment described a case where the peak of the vibration width was lowered greatly in the range of 40-50 Hz which relates to the drumming noise, the similar effect may be obtained in any range as long as it is in the range of 40-50 Hz relating to the drumming noise.

4] The present invention should not be limited to the above-described embodiment and modifications and any other improvements may be applied within the scope of a spirit of the present invention.

What is claimed is:

1. A battery unit mounting structure of an electric vehicle, comprising:
    a floor panel;
    a pair of right-and-left floor frames provided below the floor panel, each of which forms a closed-cross section extending longitudinally cooperatively with the floor panel; and
    a battery unit supporting plural battery modules and mounted at the pair of floor frames,
    wherein said battery unit comprises the battery modules and a battery case storing the plural battery modules and attached to said pair of floor frames, and
    mounting rigidity of part of said plural battery modules mounted at said battery case is set to be lower than that of other part of the plural battery modules mounted at the battery case so as to lower a peak of vibration amplitude which is defined as a vibration width, in a vertical direction, of an end portion, in a vehicle width direction, of the plural battery modules in a case where said floor panel vibrates at a frequency of 20-50 Hz and said plural battery modules roll around an axial line which extends in a vehicle longitudinal direction, passing a central point, in the vehicle width direction, of the plural battery modules.

2. The battery unit mounting structure of the electric vehicle of claim 1, wherein said plural battery modules are supported in the same position and arranged in three or more rows extending in the vehicle width direction, and the mounting rigidity of the battery modules positioned at a one-end side row is set to be lower than that of the battery modules positioned at the other-end row.

3. The battery unit mounting structure of the electric vehicle of claim 1, wherein said plural battery modules are supported in the same position and arranged in plural rows extending in the vehicle width direction, the battery modules positioned at a specified row are provided with plural mounting portions in a row direction, and mounting rigidity of said mounting portion positioned at an end side of said specified row is set to be lower than that of said mounting portion positioned at an inward side of said specified row.

4. The battery unit mounting structure of the electric vehicle of claim 3, wherein said mounting portion positioned at the end side of the specified row is formed on an inward side, in the vehicle width direction, of a mounting portion which the battery modules positioned at another row than said specified row is provided with and is positioned at an end side of said other row.

5. The battery unit mounting structure of the electric vehicle of claim 1, wherein said mounting rigidity is lowered by reducing the number of the mounting portions of said battery modules.

6. The battery unit mounting structure of the electric vehicle of claim 1, wherein said battery unit is arranged over a range from a first position corresponding to a point located below a front seat to a second position corresponding to another point located in back of said first position, and the mounting rigidity of the battery module corresponding to said first position is set to be lower than that of the battery module corresponding to said second position.

7. The battery unit mounting structure of the electric vehicle of claim 6, wherein front-side mounting rigidity of said battery module corresponding to the first position is set to be lower than rear-side mounting rigidity of said battery module corresponding to the first position.

8. The battery unit mounting structure of the electric vehicle of claim 7, wherein said battery module corresponding to the first position is provided with a smaller number of front-side mounting portions than rear-side mounting portions, and one of said front-side mounting portions which is positioned at an end side of the row is formed on an inward side, in the vehicle width direction, of one of said rear-side mounting portions which is positioned at the end side of the row.

* * * * *